UNITED STATES PATENT OFFICE.

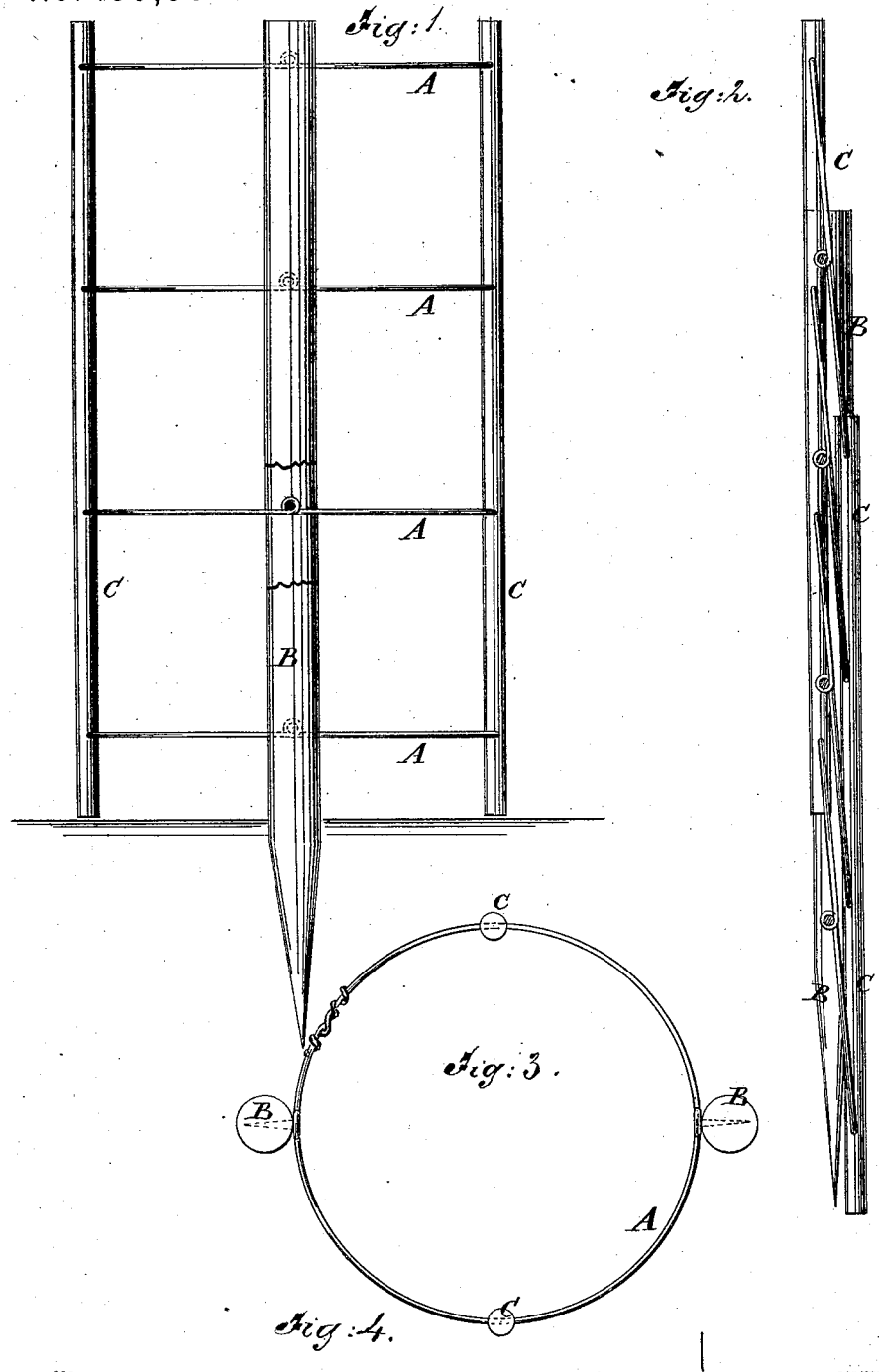

TIMOTHY L. BUELL, OF MARIETTA, OHIO.

IMPROVEMENT IN TRELLISES.

Specification forming part of Letters Patent No. 159,300, dated February 2, 1875; application filed December 28, 1874.

*To all whom it may concern:*

Be it known that I, TIMOTHY L. BUELL, of Marietta, Washington county, Ohio, have invented a new and useful Improvement in Trellises, of which the following is a specification:

This invention relates to new and useful improvements in trellises for cultivating grapes, flowers, and similar growing plants or vines; and consists in a trellis made of wire bands or rings and stakes and posts, the rings being attached to the stakes and posts, so that the trellis may be folded up when not in use.

Figure 1 is a side elevation, showing the trellis as when in use. Fig. 2 shows it folded, as when not in use. Fig. 3 is a top view of Fig. 1, and Fig. 4 is a cross-section of the folded trellis.

Similar letters of reference indicate corresponding parts.

A represents the rings, of which there may be four, (more or less.) B are the stakes, which enter the ground. C are posts, which stand on the surface of the ground. The rings pass through these posts, and are attached to the stakes B by means of screws, pins, or hooks in the stakes, around which pins, &c., the rings are turned. The stakes stand on opposite sides of the rings, and the posts are placed in intermediate positions between the stakes.

By this arrangement it will be seen that the rings will turn on the pins or hooks in the stakes, and carry the posts together or in contact with each other; and the rings will stand nearly parallel with the posts and stakes, as seen in Figs. 2 and 4, instead of horizontal, as seen in Fig. 1.

This trellis is easily made, is extremely cheap, and when not in use it may be folded, as seen in Fig. 2, and stored away for future use.

The wire rings may be made of any desired diameter, and any number of them may be used, according to the use for which the trellis is intended.

Having thus described my invention, I claim as new and desire to secure by Letters Patent—

A trellis composed of the rings A, stakes B B, and posts C C, arranged substantially as shown and described, and for the purposes set forth.

TIMOTHY L. BUELL.

Witnesses:
B. RACER,
W. H. JOHNSON.